United States Patent [19]
Ogawa et al.

[11] Patent Number: 6,028,147
[45] Date of Patent: Feb. 22, 2000

[54] BLOCK COPOLYMER, PROCESS FOR PRODUCING THE SAME AND RESIN COMPOSITION OF THE SAME

[75] Inventors: Atsuhisa Ogawa, Okayama; Kenji Shachi, Tsukuba; Atsushi Itou, Kurashiki; Kazushige Ishiura, Tsukuba, all of Japan

[73] Assignee: Kuraray Co., Ltd., Kurashiki, Japan

[21] Appl. No.: 09/158,282

[22] Filed: Sep. 22, 1998

[30] Foreign Application Priority Data

Sep. 25, 1997 [JP] Japan ................................. 9-278081

[51] Int. Cl.⁷ .................................................. C08F 259/02
[52] U.S. Cl. .......................... 525/292; 525/245; 525/251; 525/258; 525/266; 525/244; 525/92 R; 525/88
[58] Field of Search ..................... 525/292, 245, 525/251, 258, 266, 244, 92 R, 88

[56] References Cited

U.S. PATENT DOCUMENTS

| | | |
|---|---|---|
| Re. 34,640 | 6/1994 | Kennedy et al. . |
| 4,074,035 | 2/1978 | Powers et al. . |
| 5,708,103 | 1/1998 | Kajiya et al. ............................ 526/204 |
| 5,721,331 | 2/1998 | Shachi et al. ............................ 526/347 |
| 5,753,755 | 5/1998 | Shachi et al. . |

FOREIGN PATENT DOCUMENTS

| | | |
|---|---|---|
| 0 572 667 A1 | 12/1993 | European Pat. Off. . |
| 0 731 112 | 9/1996 | European Pat. Off. . |
| 6-287255 | 10/1994 | Japan . |

OTHER PUBLICATIONS

Derwent Abstracts, AN 97–017500, JP 08 283462, Oct. 29, 1996.

*Primary Examiner*—Rachel Gorr
*Attorney, Agent, or Firm*—Oblon, Spivak, McClelland, Maier & Neustadt, P.C.

[57] ABSTRACT

Herein disclosed are a block copolymer having an isobutylene-based polymer block and a vinylic aromatic hydrocarbon-based polymer block and containing a styrenic unit having a halogenated saturated aliphatic hydrocarbon group on the benzene ring at 0.01 to 2 mol % on a basis of the total structural units and being capable of markedly improving the performance of a synthetic resin when the block copolymer is blended with the synthetic resin; a process for producing the block copolymer; and a resin composition position containing the block copolymer.

11 Claims, No Drawings

BLOCK COPOLYMER, PROCESS FOR PRODUCING THE SAME AND RESIN COMPOSITION OF THE SAME

BACKGROUND OF THE INVENTION

1. Field of the Invention

The present invention relates to a block copolymer having a specific halogen-containing functional group, and a process for producing the block copolymer and a resin composition containing the block copolymer.

2. Related Art of the Invention

It has been known that block copolymers having a polymer block primarily comprising isobutylene and a polymer block primarily comprising vinylic aromatic hydrocarbons such as styrene show excellent performance in terms of barrier properties such as oxygen barrier properties. It has been known that various properties of thermoplastic resins, such as impact resistance, can be improved by blending the block copolymers into the thermoplastic resins, and therefore, the block copolymers are useful as resin modifiers (European Patent Application Publication No. 572,667).

Furthermore, block copolymers having an isobutylene-based polymer block and a styrenic polymer block as described above are lithiated and are then subjected to a reaction with carbon dioxide, whereby carboxyl groups can be added to a part of the styrene units. The block copolymers containing carboxyl groups, thus produced, have been proposed as resin modifiers with more excellent performance (Japanese Patent Application Laid-open No. Hei 6-287255).

Block copolymers having an ethylene-butylene-based copolymer block and a vinylic aromatic hydrocarbon-based polymer block are subjected to an addition reaction with unsaturated carboxylic acids such as acrylic acid and maleic anhydride in the presence of a radical generating agent, in order to add the functional groups to the copolymers, so that the carboxylic acid-type functional groups can readily be grafted to the ethylene-butylene-based copolymer block. However, block copolymers having an isobutylene-based polymer block and a vinylic aromatic hydrocarbon-based polymer block have poor radical reactivity because of the chemical structure of the isobutylene-based polymer block, and therefore, unsaturated carboxylic acids cannot be added to the block copolymers by such a method as described above. So as to yield a block copolymer having an isobutylene-based polymer block and a vinylic aromatic hydrocarbon-based polymer block and having a carboxylic acid-type functional group, very laborious procedures are required, comprising preliminarily producing a non-functional block copolymer having an isobutylene-based polymer block and a vinylic aromatic hydrocarbon-based polymer block by given polymerization procedures, lithiating the resulting non-functional block copolymer, and subjecting the resulting lithiated polymer to a reaction with carbon dioxide.

Meanwhile, U.S. Reissued Patent No. 34, 640 describes in the specification that, through the sequence of isobutylene polymerization and the polymerization of a monomer mixture of p-methylstyrene and p-chlorostyrene by using a polymerization initiating system composed of a dicumyl ether compound and titanium tetrachloride, a triblock copolymer can be recovered, having a structure such that copolymer blocks with p-methylstyrene and p-chlorostyrene are individually arranged on both the ends of the isobutylene polymer block. According to the procedures, the present inventors have produced a block copolymer having an isobutylene-based polymer block and a vinylic aromatic hydrocarbon-based polymer block and having a unit derived from p-chlorostyrene, and the inventors have further examined the application of the block copolymer as a resin modifier. However, the modification effects are not so significantly different from the modification effects of block copolymers with no p-chlorostyrene unit contained therein, or rather, the effects of the present block copolymer are sometimes poorer.

SUMMARY OF THE INVENTION

An object of the present invention is to provide a functional group-containing block copolymer capable of exerting a better modification effect when used as a resin modifier, while retaining excellent properties essential for block copolymers having an isobutylene-based polymer block and a vinylic aromatic hydrocarbon-based polymer block, such as oxygen barrier properties, wherein the functional-group containing block copolymer can be produced in a simple manner.

An additional object of the present invention is to provide a process for producing the functional-group containing block copolymer in a simple manner.

A still additional object of the present invention is to provide a resin composition modified with the functional group-containing block copolymer.

After further detailed investigations, consequently, the present inventors have found that a functional group-containing block copolymer can be produced, readily, by using a co-monomer of a specific chemical structure at a specific ratio for polymerization procedures for recovering a block copolymer having an isobutylene-based polymer block and a vinylic aromatic hydrocarbon-based polymer block, wherein the introducing site and amount of a functional group is regulated at a high level; and that the resulting functional group-containing block copolymer not only retains excellent properties unique to block copolymers having an isobutylene-based polymer block and a vinylic aromatic hydrocarbon-based polymer block but also has got further improved modification effects on various synthetic resins, which may possibly be due to the appropriate reactivity or polarity of the resulting block copolymer. Thus, the present invention has been achieved.

According to the present invention, one of the objects can be attained by providing a block copolymer having at least one polymer block (A) primarily comprising the structural unit (I) represented by the formula:

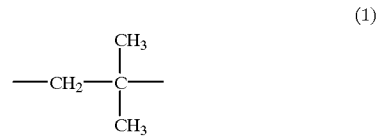

(1)

and at least one polymer block (B) primarily comprising the structural unit (II) represented by the formula:

(2)

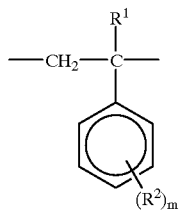

(wherein $R^1$ represents hydrogen atom or an alkyl group, $R^2$ represents a mono-valent hydrocarbon group, and m represents an integer of 0 to 3), and having the structural unit (III) represented by the formula:

(3)

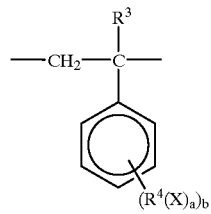

(wherein $R^3$ represents hydrogen atom or an alkyl group, $R^4$ represents a saturated aliphatic hydrocarbon group with a valence of a +1, X represents a halogen atom, and a and b independently represent 1, 2 or 3) in at least one polymer block of the polymer block (A) and the polymer block (B), wherein the content of the structural unit (III) is within a range of 0.01 to 2 mol % on a basis of the total structural units in the block copolymer.

In accordance with the present invention, the additional object can be attained by providing a process for producing a block copolymer, comprising alternately executing at least one polymerization procedure of monomers primarily comprising isobutylene and at least one polymerization procedure of monomers primarily comprising a vinylic aromatic hydrocarbon represented by the formula:

(5)

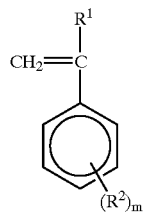

(wherein $R^1$ represents hydrogen atom or an alkyl group, $R^2$ represents a mono-valent hydrocarbon group and m represents an integer of 0 to 3), in an arbitrary order and at an arbitrary number of times, by using a polymerization initiating system comprising an organic compound having at least one group represented by the formula:

(4)

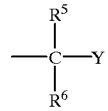

(wherein $R^5$ and $R^6$ independently represent an alkyl group, an aryl group or an aralkyl group, and Y represents an acyloxy group, an alkoxyl group, hydroxyl group or a halogen atom), and a Lewis acid, wherein as a part of the monomers for at least one polymerization procedure, use is made of a halogen-containing vinylic aromatic compound represented by the following formula:

(6)

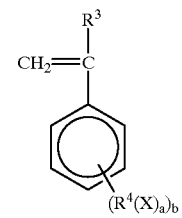

(wherein $R^3$ represents hydrogen atom or an alkyl group, $R^4$ represents a saturated aliphatic hydrocarbon group with a valence of a +1, X represents a halogen atom, and a and b independently represent 1, 2 or 3) at a ratio within a range of 0.01 to 2 mol % on a basis of the total monomers.

In accordance with the present invention, furthermore, the still additional object can be attained by providing a resin composition comprising a synthetic resin and the block copolymer.

DETAILED DESCRIPTION OF THE INVENTION

The present invention is to be described in detail below.

The block copolymer of the present invention has at least one of the polymer block (A) and at least one of the polymer block (B).

The polymer block (A) is a polymer block primarily comprising the structural unit (I), and the structural unit (I) has the structure represented by the formula (1), which is a unit derived from isobutylene. Other than the structural unit (I), the block polymer (A) may contain structural units at such a small ratio that the advantages of the present invention might not be deteriorated, and such structural units include the structural unit (III); and/or units derived from vinylic monomers such as styrenic monomers such as styrene, methylstyrene, dimethylstyrene, trimethylstyrene, α-methylstyrene, β-methylstyrene, methoxystyrene, chlorostyrene, dichlorostyrene, and trichlorostyrene; vinyl ether monomers such as vinyl methyl ether; olefinic monomers such as a β-pinene.

Alternatively, the polymer block (B) is a polymer block primarily comprising the structural unit (II), and the structural unit (II) has the structure represented by the formula (2), which is a unit derived from the vinylic aromatic hydrocarbon represented by the formula (5). In the formulas (2) and (5), the alkyl group represented by $R^1$ includes lower alkyl groups, for example methyl group and ethyl group. The mono-valent hydrocarbon group represented by $R^2$ in the formulas (2) and (5) includes alkyl groups such as methyl, ethyl and t-butyl. In the formulas (2) and (5), m represents an integer of 0 to 3; provided that m is 0, the formulas mean that no substituent $R^2$ is present on the benzene ring; provided that m is 1, 2 or 3, the formulas mean that substitution with substituents $R^2$'s of the number of m occurs on the benzene ring. If m is 2 or 3, furthermore, individual substituents $R^2$'s present on the same ring may take different chemical structures. Typical examples of the vinylic aromatic hydrocarbon represented by the formula (5) include styrene; o-, m-, or p-methylstyrene; dimethylstyrene; trimethylstyrene; α-methylstyrene and the like. The structural unit (II) contained in the block copolymer of the present invention may satisfactorily be only one species, but may be two or more species. Other than the structural unit (II), the polymer block (B) may additionally contain structural units at such a small ratio that the advantages of the invention might not be deteriorated, and such structural units include the structural unit (III); and/or units derived from vinylic monomers such as styrenic monomers, for example, β-methylstyrene, methoxystyrene, chlorostyrene, dichlorostyrene, and trichlorostyrene; vinyl ether monomers such as vinyl methyl ether; olefinic monomers such as β-pinene.

Typical forms based on the sequence of the polymer block (A) and the polymer block (B) in the block copolymer of the present invention are as follows. Diblock copolymer in the form of (A)-(B). Triblock copolymer in the form of (B)-(A)-(B). Radial block copolymer in the form of (A) [-(B)] p (herein, p represents an integer of 3 or more).

The block copolymer of the present invention contains the structural unit (III) as a structural unit copolymerized in at least one polymer block (A) and/or at least one polymer block (B). The structural unit (III) has a structure as shown by the formula (3), which is for example a unit derived from the halogen-containing vinylic aromatic compound represented by the formula (6). In the formulas (3) and (6), the alkyl group represented by $R^3$ includes lower alkyl groups, for example methyl group and ethyl group.

The saturated aliphatic hydrocarbon group of a valence of a+1 as represented by $R^4$ in the formulas (3) and (6) typically includes for example methylene group ($CH_2$; a=1), methine group (CH; a=2), carbon atom (C; a=3), 1,1,2,2-ethanetetrayl group (CH—CH; a=3). Among them, an example with a of 1 or 2 is preferable and an example with a carbon number of 1 or 2 (an example with a carbon number of 1, in particular) is preferable, from the standpoint of the modification effects exhibited by the block copolymer on other resins. From such respect, methylene group is particularly preferable as the saturated aliphatic hydrocarbon group represented by $R^4$.

The halogen atom represented by X in the formulas (3) and (6) includes one or two or more of chlorine atom, bromine atom, and the like, and among them, chlorine atom is preferable. In the formulas (3) and (6), b means the number of the substituents $R^4(X)a$'s present on the benzene ring. The b is 1, 2 or 3, and among them, 1 is preferable. If b is 2 or 3, furthermore, the individual substituents $R^4(X)a$'s of the number of b, functioning as substituents on the same benzene ring, may or may not have different chemical structures.

The halogen-containing vinylic aromatic compound represented by the formula (6) typically includes for example o-, m-, or p-(chloromethyl)styrene; o-, m-, or p-(bromomethyl)styrene; o-, m-, or p-(dichloromethyl)styrene; o-, m-, or p-(dibromomethyl)styrene; o-, m-, or p-(trichloromethyl)styrene; o-, m-, or p-(tribromomethyl)styrene; o-, m-, or p-(bromochloromethyl)styrene; α-methyl-o-, m-, or p-(chloromethyl)styrene; and 2,4-bis (chloromethyl)styrene. The structural unit (III) contained in the block copolymer of the present invention may satisfactorily be only one species, but may also be two or more species.

Among these typical examples of the halogen-containing vinylic aromatic compound, o-, m-, or p-(chloromethyl) styrene or o-, m-, or p-(bromomethyl)styrene is preferable from the respect of the modification effects exerted by the block copolymer over other resins; and o-, m-, or p-(chloromethyl)styrene is particularly preferable. When p-(chloromethyl)styrene or p-(bromomethyl)styrene is used, the resulting block copolymer can readily exert excellent modification effects over other resins, owing to the high level of the reactivity of the structural unit derived therefrom, but at the process for producing the block copolymer (particularly at processes for removing solvents during recovery after polymerization and for thermal treatment and the like), on contrast, the structural unit from p-(chloromethyl)styrene or p-(bromomethyl)styrene sometimes causes undesirable side reactions such as gelation. In the sense of appropriate controls of the reactivity, m-(chloromethyl)styrene or m-(bromomethyl)styrene may preferably be used singly or in combination with p-(chloromethyl)styrene or p-(bromomethyl)styrene, in some case, as the halogen-containing vinylic aromatic compound.

The structural unit (III) is contained at a ratio within a range of 0.01 to 2 mol % on a basis of the total structural units in the block copolymer. If the content ratio of the structural unit (III) is less than 0.01 mol % on the aforementioned basis, the effect of the block copolymer on the modification and improvement of resin properties is insufficient. If the content ratio of the structural unit (III) is above 2 mol % on the basis, excellent properties including gas barrier properties of the block copolymer having the polymer block comprising the structural unit (I) and the polymer block comprising the structural unit (II), as the fundamental structure of the block copolymer of the present invention, may often be deteriorated; and furthermore at the process for producing the block copolymer (particularly at processes for removing solvents during recovery after polymerization and for heating treatment and the like), the structural unit may sometimes cause undesirable side reactions such as gelation. From the same respect as described above, the content of the halogen atom X in the structural unit (III) is preferably at a ratio within a range of 0.01 to 1.5 gram atoms per 100 moles of the total structural units in the block copolymer.

The structural unit (III) is contained in one or both of the polymer block (A) andpolymer block (B). As towhichpolymer block should contain the structural unit (III), a preferable polymer block may appropriately be selected, taking account of the utility, including the compatibility with a subject resin to which the block copolymer is applied as a resin modifier and the like. If the structural unit (III) is contained in the polymer block (A) essentially functioning as a soft segment, the glass transition temperature of the polymer block (A) is elevated if the content ratio of the structural unit (III) in the polymer block (A) is too large, so that the polymer block (A) sometimes cannot sufficiently exert the function as a soft segment, and therefore, it is preferable that the types and content ratios of structural units, except the structural unit (I), are preferably under regulations, so that the glass transition temperature of the polymer block (A) might be 0° C. or lower, preferably −20° C. or lower.

While the molecular weight of the block copolymer of the present invention is not specifically limited; if the block copolymer has a too low molecular weight, the rubber-like properties are so insufficient that the modification effects on other resins are unsatisfactory; and if the block copolymer has a too high molecular weight, alternatively, the melt fluidity is so reduced that the block copolymer may be blended with other resins with much difficulty or the moldability of the resulting resin compositions may sometimes be deteriorated. Hence, the number average molecular weight of the block copolymer is preferably within a range of 20,000 to 1,000,000, more preferably within a range of 30,000 to 500,000.

The molecular weight of each polymer block in the block copolymer of the present invention is not specifically limited. If the polymer block (B) has a too low number average molecular weight, the polymer block (B) cannot form a micro-phase separated structure so that the resulting block copolymer readily causes cold flow or hang-up. Consequently, the block copolymer is so poor in view of the handleability that the kneading procedure of the block copolymer with other resins gets tough. If the block copolymer has a too high number average molecular weight, adversely, the properties derived from the polymer block (A), such as flexibility and gas barrier properties, for example oxygen barrier properties, are deteriorated. Thus, the number average molecular weight of the polymer block (B) is preferably within a range of 2,000 to 50,000.

If the polymer block (A) has a too low number average molecular weight, additionally, the properties derived from the polymer block (A) are hardly exerted. If the polymer block (A) has a too high number average molecular weight, the molecular chains of the block copolymer tangle together too strongly, which consequently deteriorates the melt fluidity. Therefore, the number average molecular weight of the polymer block (A) is preferably within a range of 20,000 to 700,000.

The block copolymer of the present invention can be produced readily under severe controls of the sites and amounts of the structural unit (III) to be introduced therein, by alternately executing at least one polymerization procedure of monomers primarily comprising isobutylene and at least one polymerization procedure of monomers primarily comprising a vinylic aromatic hydrocarbon represented by the formula (5) in an appropriate order and at an appropriate number of times, by using a polymerization initiating system composed of an organic compound with the group represented by the formula (4) and a Lewis acid, wherein the halogen-containing vinylic aromatic compound represented by the formula (6) is used at a specific ratio as a part of the monomers.

In the formula (4), $R^5$ and $R^6$ independently represent an alkyl group, an aryl group or an aralkyl group. The alkyl group includes for example lower alkyl groups such as methyl group and ethyl group; the aryl group includes for example phenyl group and tolyl group; and the aralkyl group includes for example benzyl group and phenethyl group. In the formula (4), Y represents an acyloxy group, an alkoxyl group, hydroxyl group or a halogen atom. The acyloxy group includes for example lower alkanoyloxy groups such as acetoxy group and propionyloxy group; the alkoxyl group includes for example methoxyl group and ethoxyl group; and the halogen atom includes for example chlorine atom and bromine atom. The group represented by the formula (4) is contained at anumber of one or two ore more within the molecule of an organic compound, and the site works as a point fromwhich polymerization of monomers is initiated. When an organic compound containing the group represented by the formula (4) at a number of one or two is used, therefore, a block copolymer in a chain form can be produced; and when an organic compound containing the group at a number of three or more is used, a radial block copolymer can be produced.

The organic compound having the group represented by the formula (4) encompasses ether with a tertiary carbon atom bound to an oxygen atom, a halogenated hydrocarbon with a tertiary carbon atombound to ahalogen atom, a tertiary alcohol, an ester of a tertiary alcohol and carboxylic acid. The ester of a tertiary alcohol and carboxylic acid specifically includes for example α-cumyl esters such as 2-acetoxy-2-phenylpropane and 2-propionyloxy-2-phenylpropane. The ether with a tertiary carbon atom bound to oxygen atom specifically includes for example -cumyl ether such as 1,4-bis (1-methoxy-1-methylethyl)benzene. The halogenated hydrocarbon with a tertiary carbon atom bound to a halogen atom specifically includes for example α-cumyl chlorides such as 2-chloro-2-phenylpropane, 1,4-bis(1-chloro-1-methylethyl)benzene and 1,3,5-tris(1-chloro-1-methylethyl)benzene; 2-chloro-2,4,4-trimethylpentane; and 2,6-dichloro-2,4,4,6-tetramethylheptane. The tertiary alcohol specifically includes for example 1,4-bis(1-hydroxy-1-methylethyl)benzene, and 2,6-dihydroxy-2,4,4,6-tetramethylheptane.

As the Lewis acid, use is preferably made of metal halides. The metal halides specifically include for example halogenated boron compounds such as boron trichloride, boron trifluoride and the boron trifluoride diethyl ether complex; halogenated titanium compounds such as titanium tetrachloride, titanium tetrabromide, and titanium tetraiodide; halogenated tin compounds such as tin tetrachloride, tin tetrabromide, and tin tetraiodide; halogenated aluminium compounds such as aluminium trichloride, an alkylaluminium dichloride, and a dialkylaluminium chloride; halogenated antimony compounds such as antimony pentachloride and antimony pentafluoride; halogenated molybdenum compounds such as molybdenum pentachloride; and halogenated tantalum compounds such as tantalum pentachloride. As the Lewis acid, additionally, use may be made of metal alkoxides such as a tetraalkoxytitanium.

As to the amount of the Lewis acid, the Lewis acid is used at a ratio in molar number within a range of 1- to 100-fold the molar number of the group represented by the formula (4).

According to the process for producing the block copolymer of the present invention, at least one polymerization procedure of monomers primarily comprising isobutylene and at least one polymerization procedure of monomers primarily comprising a vinylic aromatic hydrocarbon represented by the formula (5) are alternately executed in an appropriate order and at an appropriate number of times. The polymer block (A) is formed by the polymerization procedure of monomers primarily comprising isobutylene, and the polymer block (B) is formed by the polymerization procedure of monomers primarily comprising a vinylic aromatic hydrocarbon represented by the formula (5).

At the polymerization procedure for forming the polymer block (A), vinylic monomers may be used as co-monomers at such a small ratio that the resulting block copolymer might not deteriorate the advantages of the present invention, other than isobutylene. The vinylic monomers other than isobutylene, in this case, include for example the halogen-containing vinylic aromatic compound represented by the formula (6); and/or vinylic monomers such as styrenic monomers such as styrene, methylstyrene, dimethylstyrene, trimethylstyrene, α-methylstyrene, β-methylstyrene, methoxystyrene, chlorostyrene, dichlorostyrene, and trichlorostyrene; vinyl ether monomers such as vinyl methyl ether; and olefinic monomers such as β-pinene.

At the polymerization procedure for forming the polymer block (B), vinylic monomers other than the vinylic aromatic hydrocarbon represented by the formula (5) may be used as co-monomers at such a small ratio that the resulting block copolymer might not deteriorate the advantages of the present invention. The vinylic monomers other than the vinylic aromatic hydrocarbon represented by the formula (5), in this case, include for example the halogen-containing vinylic aromatic compound represented by the formula (6); and/or vinylic monomers, such as styrenic monomers such as β-methylstyrene, methoxystyrene, chlorostyrene, dichlorostyrene, and trichlorostyrene; vinyl ether monomers such as vinyl methyl ether; and olefinic monomers such as β-pinene.

According to the process for producing the block copolymer of the present invention, it is required that the halogen-containing vinylic aromatic compound represented by the formula (6) is used as a part of the monomers for at least one polymerization procedure of the polymerization procedure of monomers primarily comprising isobutylene and the polymerization procedure of monomers primarily comprising the vinylic aromatic hydrocarbon represented by the formula (5). The halogen-containing vinylic aromatic compound can selectively be introduced into a desiredpolymer block, byusing the halogen-containing vinylic aromatic compound as at least part of the co-monomers at the polymerization procedure to form a polymer block into which it is desired to introduce the structural unit (III). At an individual procedure for forming a polymer block into which the structural unit (III) is to be introduced, the ratio of the halogen-containing vinylic aromatic compound to the monomer to be used at the procedure is tobe selected, whereby the ratio of the structural unit (III) introduced in the polymer block can be controlled. Herein, it is required that as to the amount of the halogen-containing vinylic aromatic compound, the halogen-containing vinylic aromatic compound is used at a ratio within a range of 0.01 to 2 mol % on a basis of the total monomers for forming the block copolymer.

According to the present polymerization process, firstly, the structure of the desirable polymer block (A) or (B) is formed through the polymerization of a given monomer forming the polymer block (A) or (B) in the presence of a polymerization initiating system of an organic compound having the group represented by the formula (4) and a Lewis acid (first polymerization procedure), and then, the polymerization reaction is continued after a given monomer forming an additional polymer block is added to the resulting reaction mixture, to form a structure comprising the polymer block (A) and polymer block (B) (second polymerization procedure). If needed, subsequently, such polymerization procedures are additionally effected at an arbitrary number of times. In such a manner, a block copolymer structure having a desired sequence of the polymer blocks is formed. At an individual polymerization procedure, conditions are preferably preset so that theconversionratio of eachmonomer might be substantially at 100%.

The number average molecular weight of the resulting block copolymer can be controlled, depending on the ratio of the amount of the group represented by the formula (4) to the amount of the total monomers.

The polymerization reaction for recovering the block copolymer in accordance with the present invention can be carried out in an organic solvent. As such organic solvent, general solvents for use in cation polymerization may be used, specifically including a single solvent or a mixed solvent of saturated aliphatic hydrocarbons such as hexane, heptane, cyclohexane and methylcyclohexane; aromatic hydrocarbons such as benzene, toluene, and xylene; halogenated hydrocarbons such as methyl chloride, ethyl chloride, methylene chloride, ethylene dichloride, and chlorobenzene.

If necessary, organic Lewis bases may be present in the polymerization system, including for example esters of ethyl acetate; amines such as triethylamine and pyridine; amides such as dimethylacetamide; ethers such as THF (tetrahydrofuran) and dioxane; sulfoxides such as dimethylsulfoxide; and ketones such as acetone and methyl ethyl ketone. As to the amount of the organic Lewis bases, the organic Lewis bases are preferably used ata ratio in molar number withina range of 0.1- to 100-fold the molar number of the group represented by the formula (4) which is contained in the organic compound.

The sequential order of an organic compound having the group represented by the formula (4), a Lewis acid, a monomer and other optional compounds (for example, the organic Lewis bases described above) to be added into a reaction system at the initiation of polymerization is not essentially limited, but prior to the contact of a monomer to a Lewis acid, the remaining compounds are preferably added.

The polymerization temperature is not essentially limited, but the polymerization temperature may appropriately be selected, generally, from the range of −150° C. to +50° C.

The polymerization reaction is preferably facilitated under sufficient agitation at a state of solution in the organic solvent, while controlling the temperature.

After the given polymerization procedures on completion, a protic compound such as methanol, ethanol and water is added as a reaction terminator to the reaction system, and the resulting reaction mixture is rinsed in aqueous liquids such as water and aqueous alkali solutions to remove the Lewis acid and the like, and at subsequent processes such as reprecipitation in poor solvents such as methanol or the removal of solvents in an azeotropic manner by introducing steam into the reaction system, the block copolymer of the present invention can be separated and recovered.

The block copolymer of the present invention has an isobutylene-based polymer block and a vinylic aromatic hydrocarbon-based polymer block, and hence, the block copolymer has properties as a thermoplastic elastomer. Because the block copolymer contains appropriate amounts of functional groups with appropriate reactivity and polarity, furthermore, the block copolymer is particularly useful as a resin modifier and the like. More specifically, modification effects to improve impact resistance, impart flexibility and vibration-damping properties, and impart gas barrier properties, for example, can be exerted by the block copolymer of the present invention, if the block copolymer is blended with a variety of synthetic resins and synthetic resin compositions.

The synthetic resin to be possibly blended with the block copolymer of the present invention is not specifically limited, but as such, preference is given to a synthetic resin having a polar group. If the synthetic resin has a polar group, the reaction or interaction thereof with the specific halogen-containing group in the block copolymer of the present invention can make the modification effects particularly prominent. Among such preferable resins, those classified into thermoplastic resin include for example functional group-containing polyolefinic polymers such as ethylene-acrylic acid copolymer or salts thereof, ethylene-vinyl alcohol copolymer, ethylene-glycidyl methacrylate copolymer; thermoplastic polyamides such as nylon-6, nylon-66, nylon-612, and MXD nylon; polycarbonate; thermoplastic polyesters such as polyethylene terephthalate and polybutylene terephthalate; and thermoplastic polyurethane. Additionally, the preferable synthetic resin may satisfactorily be one of thermosetting resins, for example epoxy resin, phenol resin, and melamine resin.

Satisfactorily, plural types of these synthetic resins may be used in combination. In such case, the block copolymer of the present invention may function as a compatibilizer of two or more types of synthetic resins.

If a resin composition of the block copolymer of the present invention and a synthetic resin is mainly for the purpose of actively utilizing the properties of the synthetic resin and improving the performance of the resulting resin, for example, improving impact resistance, imparting flexibility and vibration-damping properties, and imparting gas barrier properties, preferably, the block copolymer is used at a ratio within a range of 5 to 200 parts by weight per 100 parts by weight of the synthetic resin. If the resin composition is mainly for the purpose of imparting the properties of the synthetic resin to the properties of the block copolymer of the present invention as a primary backbone structure, preferably, the block copolymer is used at a ratio within a range of 60 to 900 parts by weight per 100 parts by weight of the synthetic resin.

The resin composition comprising the block copolymer of the present invention and a synthetic resin may be produced by mixing the two polymers together according to known general methods.

For example, the resin composition is produced by using kneading machines such as continuous type extrusion kneaders such as single-screw extruder and twin-screw extruder and batch-wise kneaders, preferably, if the synthetic resin is a thermoplastic resin, because the modification effects are prominently exerted in that case. Among these kneading devices, twin-screw extruder is particularly preferably used from the viewpoints of kneading efficiency and productivity. As to the kneading temperature, preferable conditions depend on the type of a synthetic resin used, and therefore, the temperature cannot be described generally, but a temperature within a range above the melting point, not involving deterioration of the synthetic resin, is adopted frequently. For many synthetic resins, specifically, the range of 160° C. to 320° C. is preferable, and the range of 180° C. to 280° C. is more preferable.

If the synthetic resin is a thermosetting resin, for example, the resin composition may be produced by a process comprising kneading the block copolymer of the present invention into the thermosetting resin at a semi-cured state by means of a batch-wise kneader, and subsequently heating and thereby curing the resulting mixture. If the resin component prior to curing is in liquid, a process may be adopted, comprising dissolving the block copolymer of the present invention in the resin component and mixing the resulting mixture with a curing agent, for subsequent curing.

Within a range involving no severe deterioration of the performance of the block copolymer of the present invention, organic additives and inorganic additives may be added to the resin composition containing the block copolymer of the present invention. The additives include for example processing aids such as higher aliphatic carboxylic acids, for example stearic acid and derivatives thereof, process oil, and liquid polyisobutylene; reinforcing agents such as mica, carbon black, silica, glass fiber, carbon fiber, calcium carbonate, and talc; anti-oxidants; ultraviolet absorbers; and pigments. For the purpose of preventing the formation of gel, in some case, one or two or more of hydrotalcite-based compounds, hindered phenols, hindered amine-based thermal stabilizers, phosphite-based stabilizers and metal salts of higher aliphatic carboxylic acids (for example, calcium stearate, magnesium stearate and the like) may effectively be added at a ratio of about 0.01 to 1% by weight to the resin composition. Alkali metal ions such as lithium ion, sodium ion and potassium ion may be added at a ratio of about 10 to 500 ppm to the resin composition, which is effective for the prevention of gelation. The addition of alkali metal compounds allows the resin composition to contain the alkali metal ions, and the alkali metal compounds encompass alkali metal salts of an aliphatic carboxylic acid, alkali metal salts of an aromatic carboxylic acid, alkali metal salts of phosphoric acid, alkali metal complexes and the like. Specifically, the alkali metal compounds include sodium acetate, potassium acetate, sodium phosphate, lithium phosphate, sodium stearate, potassium stearate and the like.

Within such a range that the properties might not be severely deteriorated, additionally, elastomers other than the block copolymer of the present invention may be blended with the resin composition containing the block copolymer of the present invention. The elastomer includes for example butyl rubber, ethylene-propylene rubber, ethylene-propylene-diene terpolymer, styrene-isobutylene diblock copolymer, styrene-isobutylene-styrene triblock copolymer, styrene-isoprene diblock copolymer, styrene-isoprene-styrene triblock copolymer, styrene-hydrogenated isoprene diblock copolymer, styrene-hydrogenated isoprene-styrene triblock copolymer, styrene-butadiene diblock copolymer, styrene-butadiene-styrene triblock copolymer, styrene-hydrogenated butadiene diblock copolymer, and styrene-hydrogenated butadiene-styrene triblock copolymer.

The resin composition containing the block copolymer of the present invention may be molded or formed by a variety of molding or forming processes. The resin composition can be molded or formed into articles of various shapes such as sheet, film and tube, by general molding or forming processes such as injection molding, extrusion, blown-film extrusion, blow molding, and vacuum forming, and by molding or forming processes for producing a composite structure from plural resins, such as co-extrusion and insert molding.

As has been described above, in accordance with the present invention, a block copolymer is provided, having excellent properties such as gas barrier properties unique to block copolymers having an isobutylene-based polymer block and a vinylic aromatic hydrocarbon-based polymer block, and still having functional groups. The block copolymer of the present invention can be produced in a simple fashion, and by blending the block copolymer of the present invention into a synthetic resin, the properties of the synthetic resin, such as flexibility, impact resistance and gas barrier properties, can be improved greatly.

The present invention will now be descried below in more concrete with reference to examples, but it is in no way intended to be limited by these examples.

The number average molecular weight (Mn) and Mw (weight average molecular weight)/Mn of recovered polymers were determined with GPC (manufactured by Shimadzu Corporation). The amount of functional groups introduced was determined by spectral analysis recovered by NMR (manufactured by JEOL Ltd.). Additionally, the oxygen permeability constants of polymers and resin compositions were determined under conditions of an oxygen pressure of 3.5 kg/cm$^2$, a temperature of 35° C., and a humidity of 0% RH by using a gas permeation measurement system (manufactured by Yanagimoto Mfg. Co., Ltd.). The test samples for the determination of the oxygen permeability constant were prepared by a compression molding method.

The resins used in the examples are as follows.
Polyamide resin (A): nylon-6 ("UBE NYLON 1013B" manufactured by Ube Industries, Ltd.).
Ethylene-acrylate salt copolymer (B) : ethylene-zinc acrylate copolymer ("HI-MILAN 1555" manufactured by Mitsui Polychemicals, Co., Ltd.).
Ethylene-vinyl alcohol copolymer (C): "EVAL E105F" manufactured by Kuraray Co., Ltd.

REFERENCE EXAMPLE 1
(Production Example of Styrene-isobutylene-styrene Triblock Copolymer)

In a reactor equipped with an agitator were charged 800 ml of methylene chloride dehydrated and purified on Molecular Sieve 4A and 1200 ml of methylcyclohexane similarly dehydrated and purified, followed by individual addition of 2.0 g (8.6 mmol) of 1,4-bis(1-chloro-1-methylethyl)benzene, 3.9 g (36 mmol) of 2,6-dimethylpyridine, 1.35 g (17 mmol) of pyridine, and 210 g of isobutylene and further addition of 12.3 g (65 mmol) of titanium tetrachloride at −78° C., whereby polymerization was initiated. After polymerization under agitation at −78° C. for 3 hours, 1.0 g (9.4 mmol) of 2,6-dimethylpyridine and 90 g of styrene were added to the resulting mixture, whereby polymerization was further facilitated under agitation and at the same temperature for another 4 hours.

By adding 200 ml of methanol to the resulting reaction mixture solution, the polymerization reaction was terminated. The resulting mixture solution was rinsed in water, followed by reprecipitation in a vast volume of methanol, whereby the styrene-isobutylene-styrene triblock copolymer (0-1) was recovered.

The resulting block copolymer had a number average molecular weight of 38,000 at Mw/Mn of 1.25; the two polystyrene blocks individually had a number average molecular weight of 5,200; and the polyisobutylene block had a number average molecular weight of 27,000 (theoretical value based on the amounts of 1,4-bis(1-chloro-1-methylethyl)benzene and isobutylene is 25,000). The oxygen permeability constant of the resulting block copolymer was measured. The result is that the constant was 3020 cc·20 μm/m$^2$·day atm.

REFERENCE EXAMPLE 2
(Production Example of Styrene-isobutylene-styrene Triblock Copolymer in Which Chlorostyrene is Copolymerized in the Polystyrene Blocks)

In a reactor equipped with an agitator were charged 800 ml of methylene chloride dehydrated and purified on Molecular Sieve 4A and 1200 ml of methylcyclohexane similarly dehydrated and purified, followed by individual addition of 2.0 g (8.6 mmol) of 1,4-bis(1-chloro-1-methylethyl)benzene, 3.9 g (36 mmol) of 2,6-dimethylpyridine, 1.35 g (17 mmol) of pyridine, and 210 g of isobutylene and further addition of 12.3 g (65 mmol) of titanium tetrachloride at −78° C., whereby polymerization was initiated. After polymerization under agitation at −78° C. for 3 hours, 1.0 g (9.4 mmol) of 2,6-dimethylpyridine, 85.3 g of styrene and 4.7 g of p-chlorostyrene were added to the resulting mixture, whereby polymerization was further facilitated under agitation and at the same temperature for another 4 hours.

By adding 200 ml of methanol to the resulti ng reaction mixture solution, the polymerization reaction was terminated. The resulting mixture solution was rinsed in water, followed by reprecipitataion in a vast volume of methanol, whereby the styrene-isobutylene-styrene triblock copolymer (0-2) was recovered, in which p-chlorostyrene was copolymerized in the polystyrene blocks.

The resulting block copolymer had a number average molecular weight of 37,000 at Mw/Mn of 1.22; the styrene-p-chlorostyrene copolymer block had a number average molecular weight of 5,100; and the polyisobutylene block had a number average molecular weight of 28,000 (theoretical value based on the amounts of 1,4-bis(1-chloro-1-methylethyl)benzene and isobutylene is 26,000). The amount of p-chlorostyrene unit introduced was determined by NMR, which was 0.76 mol % on a basis of the total structural units. The oxygen permeability constant of the resulting block copolymer was measured. As a result, the constant was 3570 cc·20 μm/m$^2$·day·atm.

REFRENCE EXAMPLE 3
(Production Example of Styrene-isobutylene-styrene Triblock Copolymer in Which an Excess Ratio of (chloromethyl)Styrene is Copolymerized in the Polystyrene Blocks)

In a reactor equipped with an agitator were charged 800 ml of methylene chloride dehydrated and purified on Molecular Sieve 4A and 1200 ml of methylcyclohexane similarly dehydrated and purified, followed by individual addition of 2.0 g (8.6 mmol) of 1,4-bis(1-chloro-1-methylethyl)benzene, 3.9 g (36 mmol) of 2,6-dimethylpyridine, 1.35 g (17 mmol) of pyridine, and 210 g of isobutylene and further addition of 12.3 g (65 mmol) of titanium tetrachloride at −78° C., whereby polymerization was initiated. After polymerization under agitation at −78° C. for 4 hours, 3.4 g (32 mmol) of 2,6-dimethylpyridine, 82.5 g of styrene and 17.5 g of p-(chloromethyl) styrene were added to the resulting mixture, whereby polymerization was further facilitated under agitation and at the same temperature for another 4 hours.

By adding 200 ml of methanol to the resulting reaction mixture solution, the polymerization reaction was terminated. The resulting mixture solution was rinsed in water, followed by reprecipitation in a vast volume of methanol, whereby the styrene-isobutylene-styrene triblock copolymer (0-3) was recovered, in which p-(chloromethyl)styrene was copolymerized in the polystyrene blocks.

The resulting block copolymer had a number average molecular weight of 39,000 at Mw/Mn of 1.28; the two styrene-p-(chloromethyl)styrene copolymer blocks individually had a number average molecular weight of 5,800; and the polyisobutylene block had a number average molecular weight of 26,000 (theoretical value based on the amounts of 1,4-bis(1-chloro-1-methylethyl)benzene and isobutylene is 27,000). The amount of p-(chloromethyl) styrene unit introduced was determined by NMR, which was 2.84 mol % on a basis of the total structural units. Furthermore, the oxygen permeability constant of the resulting block copolymer was measured. The result is that the constant was 7660 cc·20 μm/m$^2$·day·atm.

EXAMPLE 1

(Production Example of Styrene-isobutylene-styrene Triblock Copolymer in which (chloromethyl)Styrene is Copolymerized in the Polystyrene Blocks)

In a reactor equipped with an agitator were charged 800 ml of methylene chloride dehydrated and purified on Molecular Sieve 4A and 1200 ml of methylcyclohexane similarly dehydrated and purified, followed by individual addition of 2.0 g (8.6 mmol) of 1,4-bis(1-chloro-1-methylethyl)benzene, 3.9 g (36 mmol) of 2,6-dimethylpyridine, 1.35 g (17 mmol) of pyridine, and 210 g of isobutylene and further addition of 12.3 g (65 mmol) of titanium tetrachloride at −78° C., whereby polymerization was initiated. After polymerization under agitation at −78° C. for 6 hours, 3.4 g (32 mmol) of 2,6-dimethylpyridine, 86.9 g of styrene and 4.1 g of p-(chloromethyl) styrene were added to the resulting mixture, whereby polymerization was further facilitated under agitation and at the same temperature for another 5 hours.

By adding 200 ml of methanol to the resulting reaction mixture solution, the polymerization reaction was terminated. The resulting mixture solution was rinsed in water, followed by reprecipitation in a vast volume of methanol, whereby the styrene-isobutylene-styrene triblock copolymer (1-2) was recovered, in which p-(chloromethyl) styrene was copolymerized in the polystyrene blocks.

The resulting block copolymer had a number average molecular weight of 36,000 at Mw/Mn of 1.25; the two styrene-p-(chloromethyl)styrene copolymer blocks individually had a number average molecular weight of 5,300; and the polyisobutylene block had a number average molecular weight of 25,000 (theoretical value based on the amounts of 1,4-bis(1-chloro-1-methylethyl)benzene and isobutylene is 27,000). The amount of p-(chloromethyl) styrene unit introduced was determined by NMR, which was 0.52 mol % on a basis of the total structural units. Furthermore, the oxygen permeability constant of the resulting block copolymer was measured. The result is that the constant was 3130 cc·20 $\mu$m/m$^2$·day·atm.

EXAMPLE 2

(Production Example of Styrene-isobutylene-styrene Triblock Copolymer in Which (chloromethyl)Styrene is Copolymerized in the Polystyrene Blocks)

In a reactor equipped with an agitator were charged 800 ml of methylene chloride dehydrated and purified on Molecular Sieve 4A and 1200 ml of methylcyclohexane similarly dehydrated and purified, followed by individual addition of 2.0 g (8.6 mmol) of 1,4-bis(1-chloro-1-methylethyl)benzene, 3.9 g (36 mmol) of 2,6-dimethylpyridine, 1.35 g (17 mmol) of pyridine, and 210 g of isobutylene and further addition of 12.3 g (65 mmol) of titanium tetrachloride at −78° C., whereby polymerization was initiated. After polymerization under agitation at −78° C. for 4 hours, 3.4 g (32 mmol) of 2,6-dimethylpyridine, 81.8 g of styrene and 8.2 g of p-(chloromethyl)styrene were added to the resulting mixture, whereby polymerization was further facilitated under agitation and at the same temperature for another 4 hours.

By adding 200 ml of methanol to the resulting reaction mixture solution, the polymerization reaction was terminated. The resulting mixture solution was rinsed in water, followed by reprecipitation in a vast volume of methanol, whereby the styrene-isobutylene-styrene triblock copolymer (1-3) was recovered, in which p-(chloromethyl) styrene was copolymerized in the polystyrene blocks.

The resulting block copolymer had a number average molecular weight of 38,000 at Mw/Mn of 1.20; the two styrene-p-(chloromethyl)styrene copolymer blocks individually had a number average molecular weight of 5,700; and the polyisobutylene block had a number average molecular weight of 26,000 (theoretical value based on the amounts of 1,4-bis(1-chloro-1-methylethyl)benzene and isobutylene is 27,000). The amount of p-(chloromethyl) styrene unit introduced was determined by NMR, which was 1.21 mol % on a basis of the total structural units. Furthermore, the oxygen permeability constant of the resulting block copolymer was measured. The results is that the constant was 3950 cc·20 $\mu$m/m$^2$·day·atm.

EXAMPLE 3

(Production Example of Styrene-isobutylene-styrene Triblock Copolymer in Which (chloromethyl)Styrene is Copolymerized in the Polystyrene Blocks)

In a reactor equipped with an agitator were charged 800 ml of methylene chloride dehydrated and purified on Molecular Sieve 4A and 1200 ml of methylcyclohexane similarly dehydrated and purified, followed by individual addition of 1.0 g (4.3 mmol) of 1,4-bis(1-chloro-1-methylethyl)benzene, 1.96 g (18.2 mmol) of 2,6-dimethylpyridine, 0.68 g (8.6 mmol) of pyridine, and 210 g of isobutylene and further addition of 12.3 g (65 mmol) of titanium tetrachloride at −78° C., whereby polymerization was initiated. After polymerization under agitation at −78° C. for 6 hours, 1.0 g (9.4 mmol) of 2,6-dimethylpyridine, 88 g of styrene and 3.5 g of p-(chloromethyl)styrene were added to the resulting mixture, whereby polymerization was further facilitated under agitation and at the same temperature for another 6 hours.

By adding 200 ml of methanol to the resulting reaction mixture solution, the polymerization reaction was terminated. The resulting mixture solution was rinsed in water, followed by reprecipitation in a vast volume of methanol, whereby the styrene-isobutylene-styrene triblock copolymer (1-1) was recovered, in which p-(chloromethyl) styrene was copolymerized in the polystyrene blocks.

The resulting block copolymer had a number average molecular weight of 74,000 at Mw/Mn of 1.22; the two styrene-p-(chloromethyl)styrene copolymer blocks individually had a number average molecular weight of 11,000; and the polyisobutylene block had a number average molecular weight of 49,000 (theoretical value based on the amounts of 1,4-bis(1-chloro-1-methylethyl)benzene and isobutylene is 50,000). The amount of p-(chloromethyl) styrene unit introduced was determined by NMR, which was 0.58 mol % on a basis of the total structural units. Furthermore, the oxygen permeability constant of the resulting block copolymer was measured. As a result, the constant was 3040 cc·20 $\mu$m/m$^2$·day·atm.

EXAMPLE 4

(Production Example of Styrene-isobutylene-styrene Triblock Copolymer in Which (chloromethyl)Styrene is copolymerized in the Polyisobutylene Block)

In a reactor equipped with an agitator were charged 800 ml of methylene chloride dehydrated and purified on Molecular Sieve 4A and 1200 ml of methylcyclohexane similarly dehydrated and purified, followed by individual addition of 2.0 g (8.6 mmol) of 1,4-bis(1-chloro-1-methylethyl)benzene, 3.9 g (36 mmol) of 2,6-dimethylpyridine, 1.35 g (17 mmol) of pyridine, 210 g of isobutylene and 2.8 g of p-(chloromethyl)styrene and further addition of 12.3 g (65 mmol) of titanium tetrachloride at −78° C., whereby polymerization was initiated. After polymerization under agitation at −78° C. for 6 hours, 3.4 g (32 mmol) of 2,6-dimethylpyridine and 90 g of styrene were added to the resulting mixture, whereby polymerization was further facilitated under agitation and at the same temperature for another 5 hours.

By adding 200 ml of methanol to the resulting reaction mixture solution, the polymerization reaction was terminated. The resulting mixture solution was rinsed in water, followed by reprecipitation in a vast volume of methanol, whereby the styrene-isobutylene-styrene triblock copolymer (1-4) was recovered, in which p-(chloromethyl) styrene was copolymerized in the polyisobutylene block.

The resulting block copolymer had a number average molecular weight of 39,000 at Mw/Mn of 1.21; the two polystyrene blocks individually had a number average molecular weight of 5,500; and the isobutylene-p-(chloromethyl)styrene copolymer block had a number average molecular weight of 29,000 (theoretical value based on the amounts of 1,4-bis(1-chloro-1-methylethyl)benzene, isobutylene and p-(chloromethyl)styrene is 30,000). The amount of p-(chloromethyl)styrene unit introduced was determined by NMR, which was 0.41 mol % on a basis of the total structural units. Furthermore, the oxygen permeability constant of the resulting block copolymer was measured. The result is that the constant was 3100 cc·20 $\mu$m/m$^2$·day·atm.

The results recovered in the Examples 1 to 4 and Reference Examples 1 and 3 indicate that the block copolymers independently recovered in the Examples 1 to 4 within the scope of the present invention in that the content ratios of the structural unit (III) (herein, p-(chloromethyl)styrene unit) are within a range of 0.01 to 2 mol %, have oxygen permeability constants of about 3,000 to 4,000 cc·20 $\mu$m/m$^2$·day·atm, which indicates that the block copolymers have excellent oxygen barrier properties at almost the same level as that of the block copolymer (oxygen permeability constant: 3,020 cc·20 $\mu$m/m$^2$·day·atm) with no structural unit (III) contained therein as recovered in the Reference Example 1. On contrast, the block copolymer recovered in the Reference Example 3, which is different from the present invention in that the content ratio of the structural unit (III) exceeds 2 mol %, has an oxygen permeability constant of 7,660 cc·20 $\mu$m/m$^2$·day·atm, which indicates that the block copolymer is poor in terms of oxygen barrier properties.

EXAMPLES 5 to 8

(Production Examples of Resin Compositions)

After preliminarily mixing together polyamide resin (A), a block copolymer produced in the same manner as in Example 1 or 3 (block copolymer (1-2) or (1-1)), and the block copolymer (0-1) produced in the same manner as in Reference Example 1, if desired, at weight ratios shown below in Table 1, the resulting mixtures were kneaded together under molten conditions at 240° C. by using a twin-screw extruder, whereby resin compositions were individually prepared.

These were molded into various test pieces, which were subjected to the assessment of the physical properties. Furthermore, break strength, Vicat softening point, and notched Izod impact strength were measured by the following individual methods.

1. Break strength: measured by using dumbbell No.2 test pieces prepared by injection molding, according to JIS K-7113.
2. Vicat softening point: measured by a method and a system according to JIS K-7206.
3. Notched Izod impact strength: measuredbyusing test pieces of a ⅛-inch thickness under ambient temperature, according to ASTM D-256.

The assessment results are shown below in Table 1.

COMPARATIVE EXAMPLE 1

Only the polyamide resin (A) was molded into various test pieces for the assessment of the physical properties. The results of the assessment are shown below in Table 1.

COMPARATIVE EXAMPLES 2 and 3

After preliminarily mixing together the polyamide resin (A) and a block copolymer produced in the same manner as in the Reference Example 1 or 2 (block copolymer (0-1) or (0-2)) at weight ratios shown below in Table 1, the resulting mixtures were kneaded together under molten conditions at 240° C. by using a twin-screw extruder, whereby individual resin compositions were recovered.

These were molded into various test pieces, for the assessment of the physical properties. The results of the assessment are shown below in Table 1.

TABLE 1

|  | Example 5 | Example 6 | Example 7 | Example 8 | Comparative example 1 | Comparative example 2 | Comparative example 3 |
|---|---|---|---|---|---|---|---|
| Components in parts by weight |  |  |  |  |  |  |  |
| Polyamide resin (A) | 100 | 100 | 100 | 100 | 100 | 100 | 100 |
| Block copolymer (1-1) | 40 | 0 | 20 | 0 | 0 | 0 | 0 |
| Block copolymer (1-2) | 0 | 40 | 0 | 20 | 0 | 0 | 0 |
| Block copolymer (0-1) | 0 | 0 | 20 | 20 | 0 | 40 | 0 |
| Block copolymer (0-2) | 0 | 0 | 0 | 0 | 0 | 0 | 40 |
| Assessment |  |  |  |  |  |  |  |
| Break strength (kg/cm$^2$) | 570 | 330 | 460 | 420 | 540 | 280 | 250 |
| Vicat softening point (° C.) | 206 | 201 | 196 | 191 | 216 | 182 | 188 |
| Oxygen permeability constant (cc · 20 $\mu$m/m$^2$ day · atm) | 92 | 104 | 100 | 96 | 112 | 154 | 201 |
| IZOD impact strength | NB(*) | NB(*) | NB(*) | NB(*) | 8 | 10 | 13 |

TABLE 1-continued

|  | Example 5 | Example 6 | Example 7 | Example 8 | Comparative example 1 | Comparative example 2 | Comparative example 3 |
|---|---|---|---|---|---|---|---|
| (with notches) (kg · cm/cm) | (54) | (44) | (47) | (49) | | | |

*: "NB" means no absolute sample break.

Table 1 above indicates that the impact resistance of the polyamide resin compositions with the inventive block copolymer blended therein in Examples 5 to 8 could be improved, markedly, while the polyamide resin compositions still highly retained the excellent properties unique to the polyamide resin in Comparative Example 1 in terms of mechanical strength, thermal resistance and oxygen permeability blocking properties. Compared with the polyamide resin composition of Comparative Example 2 wherein a block copolymer with no structural unit (III) contained therein, other than the block copolymer of the present invention, is blended and compared with the polyamide resin composition of Comparative Example 3 wherein a block copolymer with the functional group-containing structural unit (chlorostyrene unit) contained thereinbeing different from the structural unit (III), other than the block copolymer of the present invention, is blended, the excellent properties unique to polyamide resins in terms of mechanical strength, thermal resistance and oxygen barrier properties are more greatly retained in these polyamide resin compositions of Examples 5 to 8, and additionally, the modification effects such as the improvement of the impact resistance are more greatly exerted therein.

It is speculated that the excellent outcome attained in the polyamide resin compositions blended with the block copolymer of the present invention may be derived from the improvement of the dispersibility of the block copolymer in the polyamide resins, due to the structural unit (III) contained at an appropriate amount in the block copolymer of the present invention.

EXAMPLES 9 to 11
(Production Examples of Resin Compositions)

After preliminarily mixing together the ethylene-acrylate salt copolymer (B), a block copolymer produced in the same manner as in the Example 2 or 4 (block copolymer (1-3) or (1-4)), and the block copolymer (0-1) produced in the same manner as in Reference Example 1, if desired, at weight ratios shown below in Table 2, the resulting mixtures were kneaded together under molten conditions at 200° C. by using a twin-screw extruder, whereby individual resin compositions were recovered.

These were molded into various test pieces, for the assessment of the physical properties. The break strength, break elongation and average dispersed particle size (disperse phase comprises block copolymers) were measured by the following individual methods.
1. Break strength and break elongation: measured by using dumbbell No.2 test pieces prepared by injection molding, according to JIS K-7113.
2. Average dispersed particle size: the particle sizes of the block copolymers functioning as a disperse phase were measured by observation and photograph with scanning electron microscope, and the average was calculated.

The assessment results are shown below in Table 2.

COMPARATIVE EXAMPLE 4

The ethylene-acrylate salt copolymer (B) was singly molded into various test pieces, for the assessment of the physical properties. The assessment results are shown below in Table 2.

COMPARATIVE EXAMPLES 5 AND 6

After preliminarily mixing together the ethylene-acrylate salt copolymer (B), and a block copolymer produced in the same manner as in the Reference Example 1 or 2 (block copolymer (0-1) or (0-2)), at weight ratios shown below in Table 2, the resulting mixtures were kneaded together under molten conditions at 200° C. by using a twin-screw extruder, whereby individual resin compositions were recovered.

These were molded into various test pieces, for the assessment of the physical properties. The assessment results are shown below in Table 2.

TABLE 2

|  | Example 9 | Example 10 | Example 11 | Comparative example 4 | Comparative example 5 | Comparative example 6 |
|---|---|---|---|---|---|---|
| Components in parts by weight | | | | | | |
| Ethylene-acrylate salt copolymer (B) | 100 | 100 | 100 | 100 | 100 | 100 |
| Block copolymer (1-3) | 25 | 0 | 5 | 0 | 0 | 0 |
| Block copolymer (1-4) | 0 | 25 | 0 | 0 | 0 | 0 |
| Block copolymer (0-1) | 0 | 0 | 20 | 0 | 25 | 0 |
| Block copolymer (0-2) | 0 | 0 | 0 | 0 | 0 | 25 |
| Assessment | | | | | | |
| Break strength (kg/cm$^2$) | 230 | 250 | 220 | 210 | 170 | 210 |
| Break elongation (%) | 360 | 330 | 320 | 290 | 310 | 220 |

TABLE 2-continued

|  | Example 9 | Example 10 | Example 11 | Comparative example 4 | Comparative example 5 | Comparative example 6 |
|---|---|---|---|---|---|---|
| Average dispersed particle size ($\mu$m) | 0.5 | 0.5 | 0.7 | — | 2 | 2 |
| Oxygen permeability constant (cc · 20 $\mu$m/m$^2$ day · atm) | 2270 | 2810 | 2740 | 6220 | 3010 | 3320 |

Table 2 above indicates that greater flexibility is imparted (improvement of break elongation) to the ethylene-acrylate salt copolymer compositions with the block copolymer of the present invention blended therein in Examples 9 to 11, while the ethylene-acrylate salt copolymer compositions can still highly retain the excellent properties unique to the ethylene-acrylate salt copolymer of Comparative Example 4, in terms of mechanical strength, and additionally, the oxygen barrier properties can be highly improved. Compared with the ethylene-acrylate salt copolymer composition of Comparative Example 5 wherein a block copolymer with no structural unit (III) contained therein, other than the block copolymer of the present invention, is blended and compared with the ethylene-acrylate salt copolymer composition of Comparative Example 6 wherein a block copolymer with the functional group-containing structural unit (chlorostyrene unit) contained therein being different from the structural unit (III), other than the block copolymer of the present invention, is blended, the dispersibility of the block copolymer is improved in these ethylene-acrylate salt copolymer compositions of Examples 9 to 11, and additionally, the modification effects of flexibility and oxygen barrier properties are greatly exerted therein.

EXAMPLES 12 to 14
(Production Examples of Resin Compositions)

After preliminarily mixing together the ethylene-vinyl alcohol copolymer (C), and a block copolymer produced in the same manner as in the Example 1 or 4 (block copolymer (1-2) or (1-4)), at weight ratios shown below in Table 3, the resulting mixtures were kneaded together under molten conditions at 230° C. by using a twin-screw extruder, whereby individual resin compositions were recovered.

These were molded into various test pieces, for the assessment of the physical properties. The break strength, break elongation and Izod impact strength with notches were measured, individually, by the methods described below.

1. Break strength and break elongation: measured by using dumbbell No.2 test pieces prepared by injection molding, according to JIS K-7113.
2. Izod impact strength with notches: measured by using test pieces of a ⅛-inch thickness under ambient temperature, according to ASTM D-256.

The assessment results are shown below in Table 3.

COMPARATIVE EXAMPLE 7

Only the ethylene-vinyl alcohol copolymer (C) was molded into various test pieces for the assessment of the physical properties. The results of the assessment are shown below in Table 3.

COMPARATIVE EXAMPLES 8 AND 9

After preliminarily mixing together the ethylene-vinyl alcohol copolymer (C), and a block copolymer produced in the same manner as in the Reference Example 1 or 2 (block copolymer (0-1) or (0-2)) at weight ratios shown below in Table 3, the resulting mixtures were kneaded together under molten conditions at 230° C. by using a twin-screw extruder, whereby individual resin compositions were recovered.

These were molded into various test pieces, for the assessment of the physical properties. The results of the assessment are shown below in Table 3.

TABLE 3

|  | Example 12 | Example 13 | Example 14 | Comparative example 7 | Comparative example 8 | Comparative example 9 |
|---|---|---|---|---|---|---|
| Components in parts by weight |  |  |  |  |  |  |
| Ethylene-vinyl alcohol copolymer (C) | 100 | 100 | 100 | 100 | 100 | 100 |
| Block copolymer (1-2) | 40 | 100 | 0 | 0 | 0 | 0 |
| Block copolymer (1-4) | 0 | 0 | 40 | 0 | 0 | 0 |
| Block copolymer (0-1) | 0 | 0 | 0 | 0 | 40 | 0 |
| Block copolymer (0-2) | 0 | 0 | 0 | 0 | 0 | 40 |
| Assessment |  |  |  |  |  |  |
| Break strength (kg/cm$^2$) | 390 | 330 | 370 | 590 | 320 | 360 |
| Break elongation (%) | 320 | 380 | 290 | 40 | 290 | 170 |

TABLE 3-continued

|  | Example 12 | Example 13 | Example 14 | Comparative example 7 | Comparative example 8 | Comparative example 9 |
|---|---|---|---|---|---|---|
| Oxygen permeability constant (cc · 20 μm/m² day · atm) | 8 | 44 | 4 | 2 | 7 | 9 |
| IZOD impact strength (with notches) (kg · cm/cm) | 23 | NB(*) (61) | 22 | 4 | 9 | 5 |

*: "NB" means no absolute sample break.

Table 3 above indicates that great flexibility is imparted (improvement of break elongation) to the ethylene-vinyl alcohol copolymer compositions with the block copolymer of the present invention blended therein of Examples 12 to 14, while the ethylene-vinyl alcohol copolymer compositions can still highly retain the excellent properties unique to the ethylene-vinyl alcohol copolymer of Comparative Example 7, in terms of mechanical strength and oxygen barrier properties, and additionally, the impact resistance can be remarkably improved. It is also indicated that compared with the ethylene-vinyl alcohol copolymer composition of Comparative Example 8 wherein a block copolymer with no structural unit (III) contained therein, other than the block copolymer of the present invention, is blended and compared with the ethylene-vinyl alcohol copolymer composition of Comparative Example 9 wherein a block copolymer with the functional group-containing structural unit (chlorostyrene unit) contained therein being different from the structural unit (III), other than the block copolymer of the present invention, is blended, the modification effects of impact resistance are greatly improved in these ethylene-vinyl alcohol copolymer compositions of Examples 12 to 14.

It is speculated that the excellent outcome attained in the ethylene-vinyl alcohol copolymer compositions with the inventive block copolymer blended therein may be attributable to the improvement of the dispersibility of the block copolymer in the ethylene-vinyl alcohol copolymer due to the presence of an appropriate amount of the structural unit (III) in the block copolymer of the present invention.

What is claimed is:

1. A block copolymer having at least one polymer block (A) primarily comprising the structural unit (I) represented by the formula:

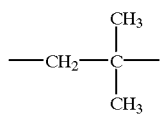

(1)

and at least one polymer block (B) primarily comprising the structural unit (II) represented by the formula:

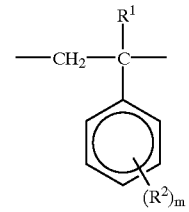

(2)

(wherein $R^1$ represents hydrogen atom or an alkyl group, $R^2$ represents a mono-valent hydrocarbon group, and m represents an integer of 0 to 3), and having the structural unit (III) represented by the formula:

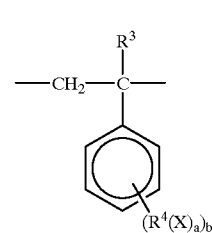

(3)

(wherein $R^3$ represents hydrogen atom or an alkyl group, $R^4$ represents a saturated aliphatic hydrocarbon group with a valence of a+1, X represents a halogen atom, and a and b independently represent 1, 2 or 3) in at least one polymer block of the polymer block (A) and the polymer block (B), wherein the content of the structural unit (III) is within a range of 0.01 to 2 mol % on a basis of the total structural units in the block copolymer.

2. The block copolymer according to claim 1, wherein $R^4$, X, a and b in the formula (3) independently are methylene group, chlorine atom, 1 and 1, respectively.

3. The block copolymer according to claim 1, wherein the content of a halogen atom represented by X in the structural unit (III) is at a ratio within a range of 0.01 to 1.5 gram atoms per 100 moles of the total structural units in the block copolymer.

4. The block copolymer according to claim 1, wherein the sequence of the polymer block (A) and the polymer block (B) is (A)-(B), (B)-(A)-(B) or (A) p (herein, p represents an integer of 3 or more).

5. The block copolymer according to claim 1, having a number average molecular weight within a range of 20,000 to 1,000,000.

6. A process for producing a block copolymer, comprising alternately executing at least one polymerization procedure of monomers primarily comprising isobutylene and at least one polymerization procedure of monomers primarily comprising a vinylic aromatic hydrocarbon represented by the formula:

(5)

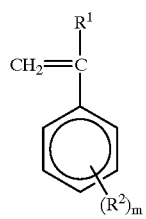

(wherein $R^1$ represents hydrogen atom or an alkyl group, $R^2$ represents a mono-valent hydrocarbon group and m represents an integer of 0 to 3), in an arbitrary order and at an arbitrary number of times, by using a polymerization initiating system comprising an organic compound having at least one group represented by the formula:

(4)

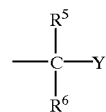

(wherein $R^5$ and $R^6$ independently represent an alkyl group, an aryl group or anaralkyl group, andY represents an acyloxy group, an alkoxyl group, hydroxyl group or a halogen atom), and a Lewis acid, wherein as a part of the monomers for at least one polymerization procedure, use is made of a halogen-containing vinylic aromatic compound represented by the following formula:

(6)

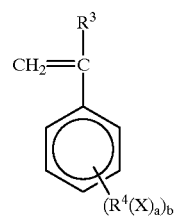

(wherein $R^3$ represents hydrogen atom or an alkyl group, $R^4$ represents a saturated aliphatic hydrocarbon group with a valence of a+1, X represents a halogen atom, and a and b independently represent 1, 2 or 3) at a ratio within a range of 0.01 to 2 mol % on a basis of the total monomers.

7. The production process according to claim 6, wherein the halogen-containing vinylic aromatic compound is o-, m-, or p-(chloromethyl)styrene.

8. A resin composition comprising a synthetic resin and the block copolymer according to claim 1.

9. The resin composition according to claim 8, wherein the synthetic resin is a synthetic resin having a polar group.

10. The resin composition according to claim 8, the resin composition being produced by using 5 to 200 parts by weight of the block copolymer per 100 parts by weight of the synthetic resin.

11. The resin composition according to claim 8, the resin composition being produced by kneading the thermoplastic resin and the block copolymer together under molten conditions, wherein the synthetic resin is a thermoplastic resin.

\* \* \* \* \*